United States Patent [19]

Lien

[11] Patent Number: 5,339,780
[45] Date of Patent: Aug. 23, 1994

[54] CENTRIFUGAL DEVICE FOR ROTARY ENGINE

[76] Inventor: Orphey A. Lien, P.O. Box 2047, North Star Rt., Polar, Mont. 59255

[21] Appl. No.: 104,566

[22] Filed: Aug. 11, 1993

[51] Int. Cl.$^5$ .............................................. F02B 53/00
[52] U.S. Cl. ...................... 123/243; 418/151; 418/257
[58] Field of Search ................. 123/243; 418/151, 257

[56] References Cited

U.S. PATENT DOCUMENTS

| | | | |
|---|---|---|---|
| 29,473 | 8/1860 | Donovan | 418/151 |
| 2,040,036 | 5/1936 | Weeks | 418/151 |
| 2,314,056 | 3/1943 | Sobek | 418/151 |
| 3,496,916 | 2/1970 | Jones | |
| 3,589,842 | 6/1971 | Timperley | 418/151 |
| 4,721,079 | 1/1988 | Lien | 123/241 |

Primary Examiner—Richard A. Bertsch
Assistant Examiner—Charles G. Freay
Attorney, Agent, or Firm—Hopkins, French, Crockett, Springer & Hoopes

[57] ABSTRACT

A novel centrifugal device that attaches to multiple rotating cross-vanes in a rotary engine so as to offset the effects of centrifugal forces on the cross-vanes and thereby reduce seal element wear on the cross-vanes. The device consists of two clevis arms and a weight arm pivotally pinned to each end of the rotating cross-vanes.

7 Claims, 5 Drawing Sheets

5,339,780

CENTRIFUGAL DEVICE FOR ROTARY ENGINE

FIELD OF THE INVENTION

This invention relates to a centrifugal device that counteracts the centrifugal forces operating on rotor parts in a rotary engine.

BACKGROUND OF THE INVENTION

Rotary engines are well known in the art and have impressive power per unit weight. One of their drawbacks is friction as a result of centrifugal force on the rotor parts. Exemplary of this is a rotary engine disclosed in U.S. Pat. No. 4,721,079 issued to the present inventor which is a spherical housing having internal rotors and multiple cross-vanes that bear against the inside of the housing creating friction that varies as the square of the rotational speed. It is, therefore, the purpose of this invention to provide a simple centrifugally actuated device that offsets the forces that drive the cross-members against the housing interior.

DESCRIPTION OF THE PRIOR ART

U.S. Pat. No. 3,496,916 issued to Jones discloses a device used in a rotary engine, the contact pressure of the apex seals against portions of the housing normally increases at high engine speeds owing to centrifugal effects, causing wear and power loss through friction. The invention provides a device responsive to centrifugal and frictional effects which retracts the seal at high speeds to diminish contact pressure.

SUMMARY OF THE INVENTION

The centrifugal device of the present invention is used to reduce friction and in a rotary engine having an eccentrically mounted rotor within a housing and multiple cross-vanes rotatably engaging a housing inner surface; the device comprises:

a weight arm having a weight on a first end and a pair of opposing and pivotally attached clevis rods at separate pivot points on a second end of the weight arm, a first clevis rod pivotally attached to a first cross-vane in a first direction, a second clevis rod pivotally attached by a clevis pin to a second cross-vane in an opposite second direction, wherein rotor centrifugal force during rotary engine operation causes opposing motion of the clevis rods thereby causing a restraining force on the cross-vanes at a 90° angle with the clevis rod motion so as to reduce a crossvane force against the housing inner surface.

Other objects, advantages, and capabilities of the present invention will become more apparent as the description proceeds.

DETAILED DESCRIPTION OF THE PREFERRED EMBODIMENTS

Figure 1:
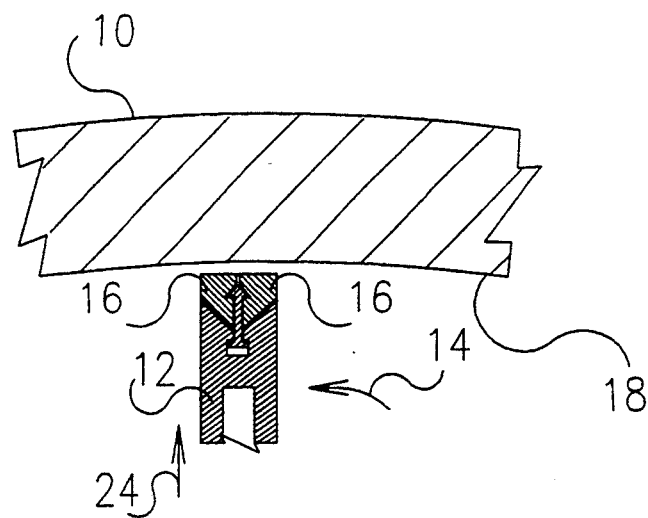
FIG. 1 is a front-section view of a rotating crossvane in a rotary engine housing (prior art)

FIG. 1 illustrates in partial section the stationary spherical housing 10 of a rotary engine having a cross-vane 12 rotating in the direction of arrow 14. This cross-vane is one of the internal parts of the rotary engine disclosed in U.S. Pat. No. 4,721,079 issued to the present inventor. (See FIG. 2). The cross-vane 12 has seal elements 16 that bear against inner surface 18 of the spherical housing 10. The multiple cross-vanes 12 are mounted on a rotor eccentric to the housing 12 as seen by rotor center 20 displaced from housing center 22 of FIG. 2.

It is the purpose of this inventive centrifugal device to reduce the centrifugal force in direction 24 as the engine rotor speed increases thereby minimizing wear on surface 18 and seal elements 16 (FIG. 1).

Figure 3:
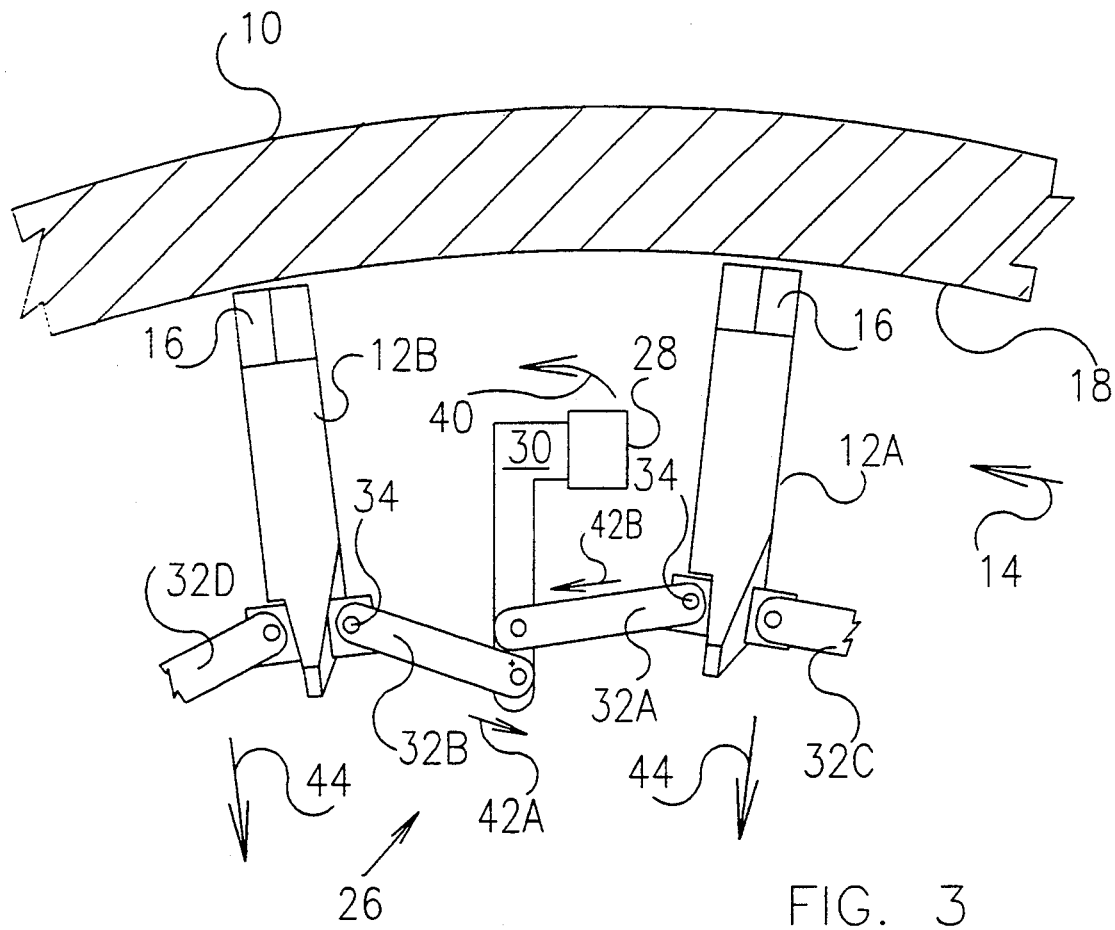
FIG. 3 is a partial front-elevation and section of the present centrifugal device.
Figure 4:
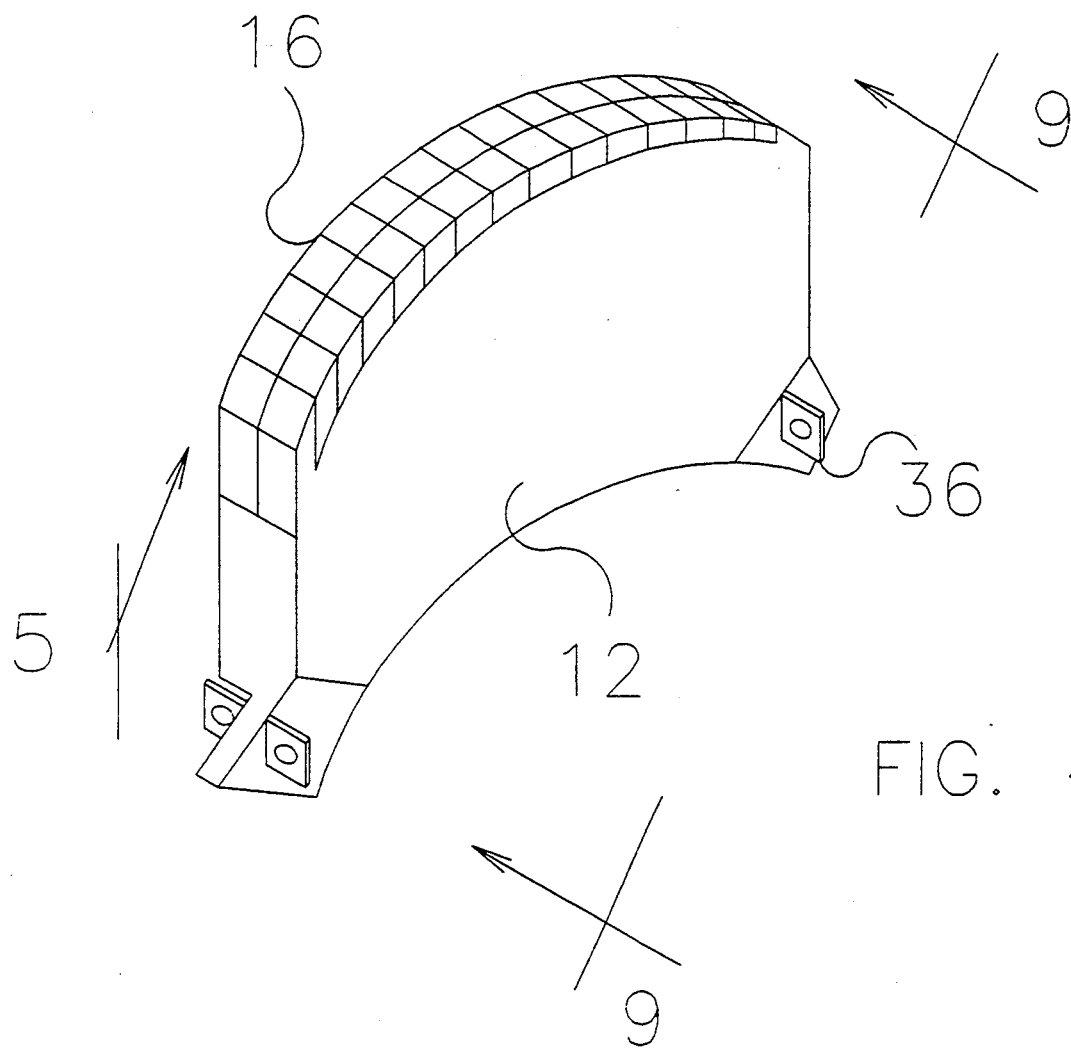
FIG. 4 is a perspective view of a cross-vane from a rotary engine.
Figure 5:
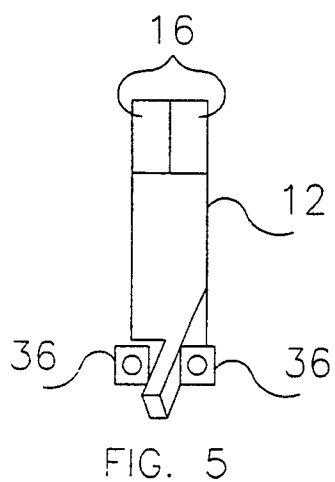
FIG. 5 is a side-elevation of the cross-vane taken along lines 5—5 of FIG. 4.
Figure 9:
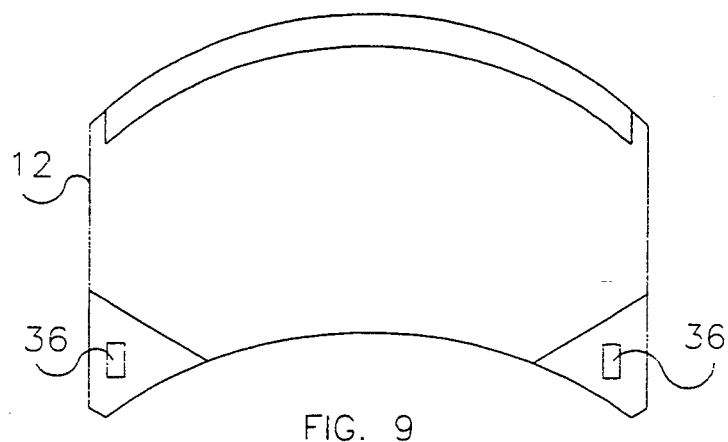
FIG. 9 is a front elevation of the cross-arm taken along lines 9—9 of FIG. 4.

The centrifugal device 26 can be seen assembled in FIG. 3. This simple device consists of a weight 28 mounted on weight arm 30, which in turn is pivotally connected to a first clevis rod 32A and a second clevis rod 32B. This weight 28 is offset from a radial line that passes through the pivot points of the clevis rods 32A and 32B. An opposite end of each clevis rod is pinned to two adjacent cross-vanes 12A and 12B by four (4) clevis pins 34 which penetrate four (4) clevis eyes 36 (FIGS. 4, 5, and 9 ) and pivotally retain the rods 32 to the cross-vanes 12. FIGS. 4 and 9 shows the cross-vane 12 with the clevis eyes 36 at each end.

Figure 6:
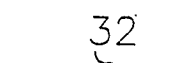
FIG. 6 is a front elevation of clevis rod.
Figure 7:
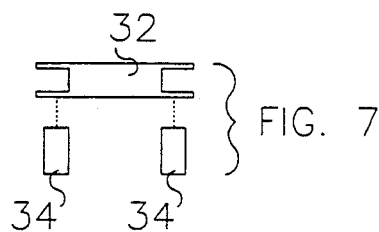
FIG. 7 is top exploded view of the clevis rod and pin.

Details of the clevis rod 32, pins 34, and clevis eyes 36 can be seen in FIGS. 6, 7, and 9, respectively. Since each cross-vane 12 has four (4) clevis rods attaching to adjacent vanes, a flexible circular ring is formed on each end of the cross-vanes.

Figure 10:
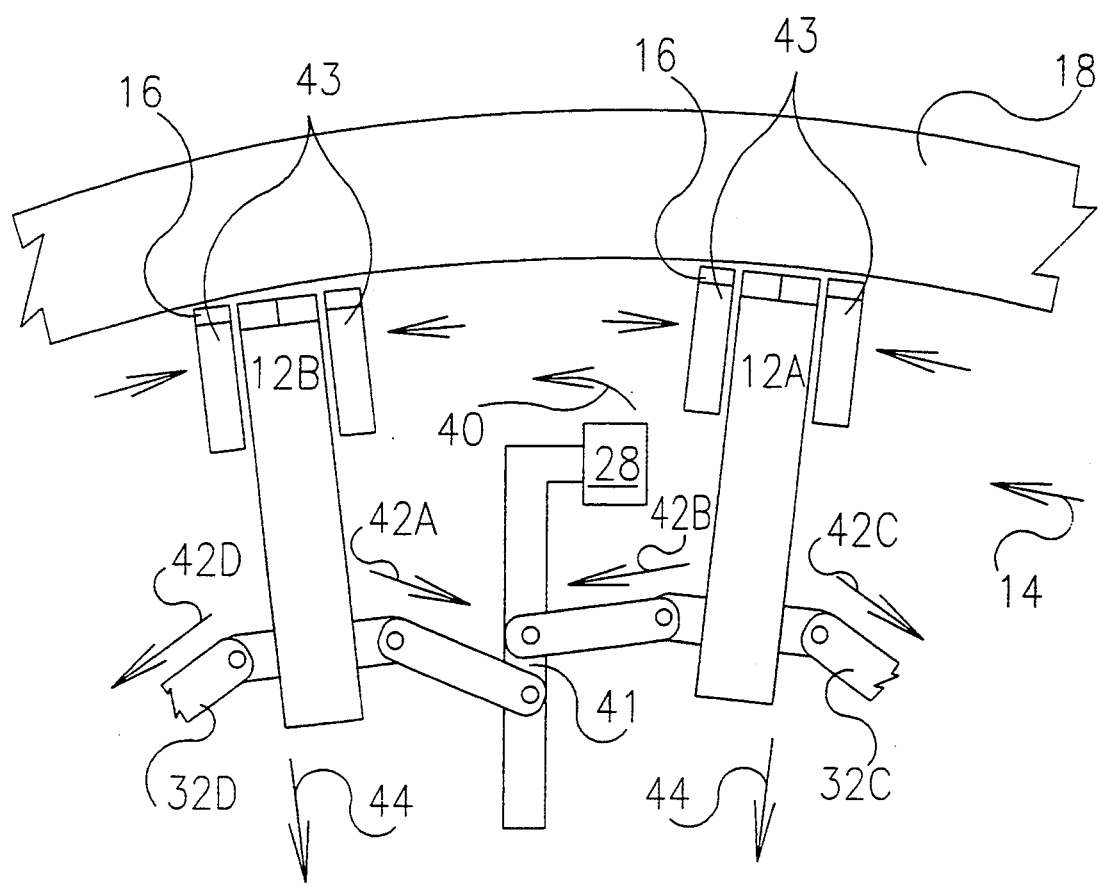
FIG. 10 is a force diagram of the centrifugal device.

Operation of the centrifugal device 26 will be made by referring again to FIGS. 3 and 10. Rotor rotation in direction 14 causes a centrifugal force to move weight 28 in direction 40. Motion in that direction causes rotation of the clevis rods 32A and 32B about a center of rotation 41 as at arrows 42A and 42B. However, the cross-vanes 12 are restrained from horizontal motion by engine rotor 43 (FIGS. 2 and 10) and by forces 42C and 42D from adjacent clevis rods 32C and 32D (FIG. 10) but are free to slide up and down. Therefore, the cross-vanes 12A and 12B will be subject to a force toward the center of the rotor at a 90° angle or greater with the clevis rod causing a force as indicated by arrows 44 thereby reducing the force of seal elements 16 against the housing surface 18.

Figure 2:
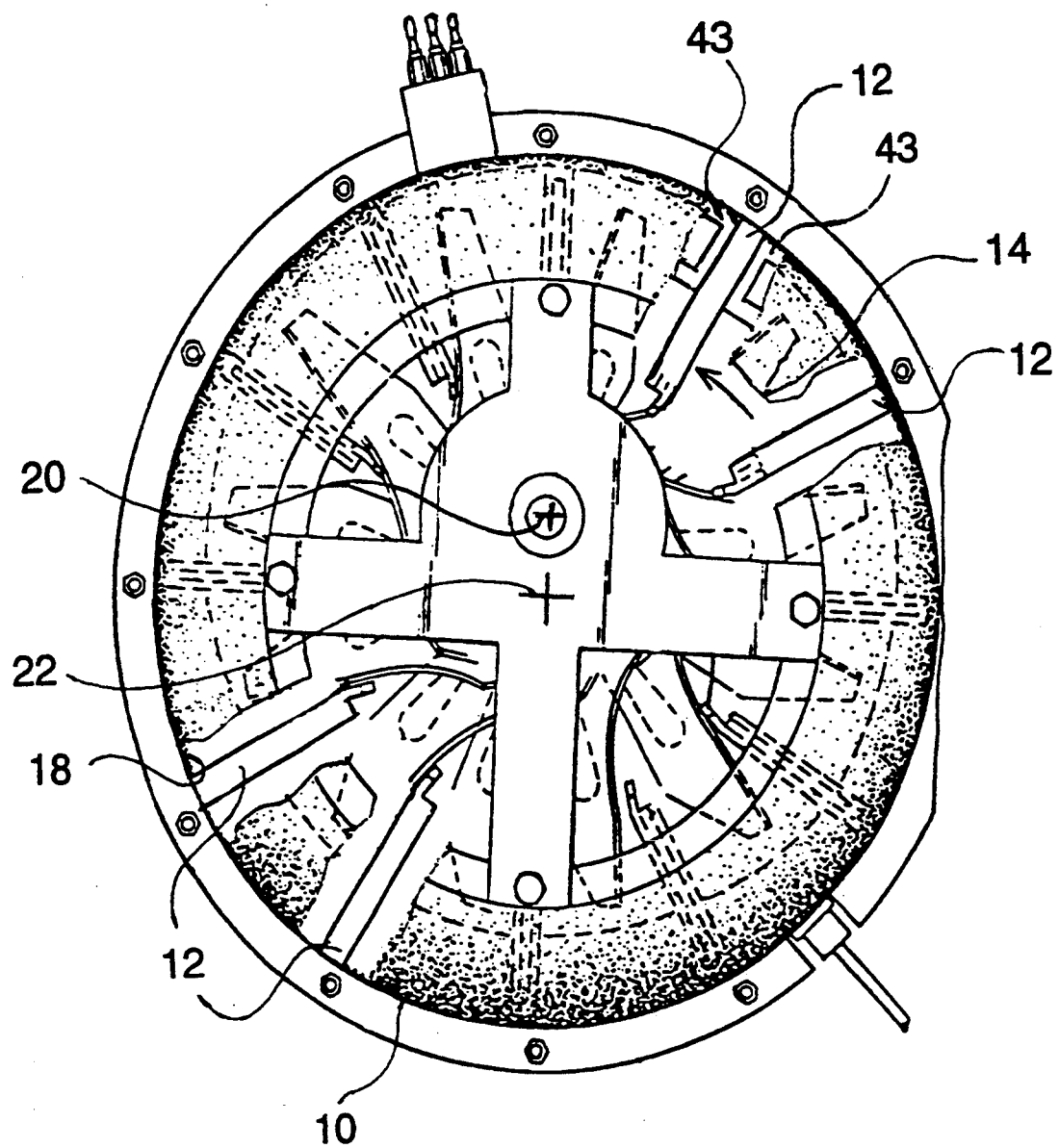
FIG. 2 is a front cutaway elevation of a rotary engine (prior art)
Figure 8:
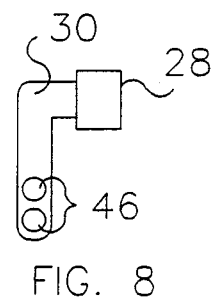
FIG. 8 is a front elevation of a weight arm.

Thus, the centrifugal forces acting on the cross-vanes 12 are offset by the centrifugal forces on the weight arms 28, reducing wear on the seal elements 16. Of course, there are two centrifugal devices 26 for each cross-vane 12 since there is one device connected at each end of cross-vane 12 at clevis eye 36 (FIG. 4 and 9). The forces due to the centrifugal device 20 are dependent on the mass of weight 28, the length dimensions of the weight arm, the location of the weight arm pin apertures 46 (FIG. 8), and the distance from the rotor center 20 (FIG. 2).

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. In a rotary engine having an eccentrically mounted rotor within a housing and multiple cross-vanes rotatably engaging a housing inner surface, a centrifugal device mounted between a pair of cross-vanes, the device comprising:
   a. a weight arm having a weight on a first end and a pair of opposing and pivotally attached first and second clevis rods at separate pivot points on a second end of the weight arm;
   b. said first clevis rod pivotally attached to a first cross-vane in a first direction; and
   c. said second clevis rod pivotally attached by a clevis pin to a second cross-vane in an opposite second direction;
      wherein a rotor centrifugal force during rotary engine operation causes opposing motion of the clevis rods thereby causing a restraining force on the cross-vanes at a 90° angle or greater with the clevis rod motion so as to reduce a cross-vane force against the housing inner surface.

2. The centrifugal device as recited in claim 1 wherein the pivotally attached clevis rods are attached to a pair of weight arm apertures by a pair of clevis pins.

3. The centrifugal device as recited in claim 2 wherein the first and second clevis rods are pivotally attached to the first and second cross-vanes by a pair of clevis pins inserted within a pair of clevis eyes on each cross-vane.

4. The centrifugal device as recited in claim 2 wherein the weight on the weight arm is offset from a radial line that passes through the weight arm pivot points.

5. In a rotary engine having an eccentrically mounted rotor within a housing and multiple cross-vanes rotatably engaging a housing inner surface, a centrifugal device mounted between a pair of cross-vanes, the device comprising:
   a. a weight arm having a weight on a first end and a pair of opposing and pivotally attached first and second clevis rods at separate pivot points on a second end of the weight arm, wherein the weight is offset from a radial line that passes through the weight arm pivot points;
   b. said first clevis rod pivotally attached by a clevis pin to a first cross-vane in a first direction; and
   c. said second clevis rod pivotally attached by a clevis pin to a second cross-vane in an opposite second direction;
      wherein rotor centrifugal force during rotary engine operation causes opposing motion of the clevis rods thereby causing a restraining force on the cross-vanes at a 90° angle or greater with the clevis rod motion so as to reduce a cross-vane force against the housing inner surface.

6. The centrifugal device as recited in claim 5 wherein the pivotally attached clevis rods are attached to a pair of weight arm apertures by a pair of clevis pins.

7. The centrifugal device as recited in claim 6 wherein the first and second clevis rods are pivotally attached to the first and second cross-vanes by clevis pins inserted within a pair of clevis eyes on each cross-vane.

* * * * *